(12) United States Patent
Ozono

(10) Patent No.: US 6,717,617 B1
(45) Date of Patent: Apr. 6, 2004

(54) IMAGE READER

(75) Inventor: Masashi Ozono, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/424,188

(22) PCT Filed: Mar. 16, 1999

(86) PCT No.: PCT/JP99/01286

§ 371 (c)(1), (2), (4) Date: Jan. 5, 2000

(87) PCT Pub. No.: WO99/48280

PCT Pub. Date: Sep. 23, 1999

(30) Foreign Application Priority Data

Mar. 19, 1998 (JP) .......................... 10-070156

(51) Int. Cl.[7] .......................... H04N 5/335; H04N 1/46
(52) U.S. Cl. ................. 348/324; 348/229.1; 348/312; 348/234; 358/517
(58) Field of Search ............... 348/272, 302, 348/273, 281, 319, 234, 235, 237, 712, 713, 253, 49, 71; 341/141; 358/482, 483, 517

(56) References Cited

U.S. PATENT DOCUMENTS

| | | | | |
|---|---|---|---|---|
| 4,876,591 A | * | 10/1989 | Muramatsu ................. 348/236 |
| 5,555,023 A | * | 9/1996 | Maenaka et al. ............ 348/253 |
| 5,726,707 A | * | 3/1998 | Sakurai et al. ............ 348/222.1 |
| 5,874,909 A | * | 2/1999 | Soenen et al. ............... 341/141 |
| 6,449,013 B1 | * | 9/2002 | Suzuki et al. ................ 348/279 |
| 6,509,927 B1 | * | 1/2003 | Prater et al. ............. 348/222.1 |
| 6,570,615 B1 | * | 5/2003 | Decker et al. ............... 348/272 |

FOREIGN PATENT DOCUMENTS

| | | |
|---|---|---|
| JP | 63-122356 | 5/1988 |
| JP | 2-113765 | 4/1990 |
| JP | 5-260297 | 10/1993 |
| JP | 9-326930 | 12/1997 |

* cited by examiner

Primary Examiner—Ngoc-Yen Vu
Assistant Examiner—Paul W. Myers
(74) Attorney, Agent, or Firm—RatnerPrestia

(57) ABSTRACT

In an image reading apparatus, for reading in the color mode, outputs of even-number pixels and odd-number pixels of respective color components output from a CCD line sensor are time shared and multiplexed at selectors and are sent to A/D converters, respectively. When reading in the monochrome mode, the selectors select the row of odd-number pixels and the row of even-number pixels of a color component selected as the dropout color, and the even-number pixels and the odd-number pixels of the color component are separately converted by individual A/D converters into digital signals. A rearrangement section recombines and outputs these digitized signals in a single row of sequential data. By so doing, even when the reading is conducted faster in the monochrome mode than in the color mode, it is not necessary to increase conversion speed of the A/D converters.

8 Claims, 19 Drawing Sheets

| an | bn | Output |
|----|----|--------|
| 0  | 0  | xn     |
| 0  | 1  | yn     |
| 1  | 0  | zn     |
| 1  | 1  | z      |

| an | bn | Output |
|---|---|---|
| 0 | 0 | xn |
| 0 | 1 | yn |
| 1 | 0 | zn |
| 1 | 1 | z |

FIG.7A
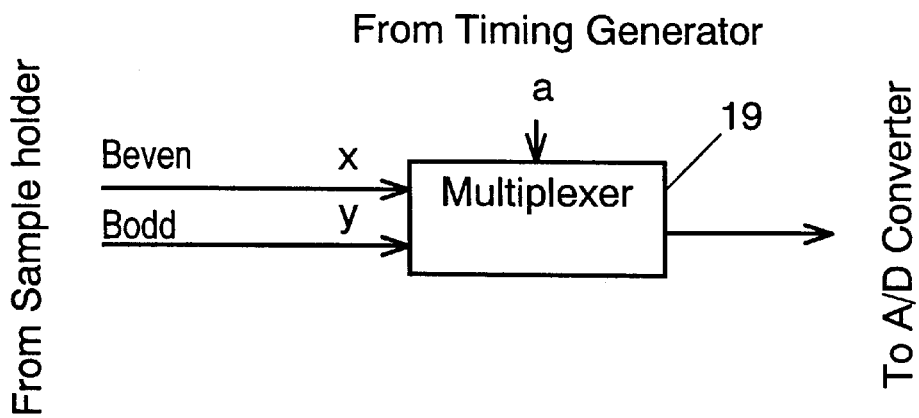
FIG.7B
| an | Output |
|---|---|
| 0 | x |
| 1 | y |
FIG.8
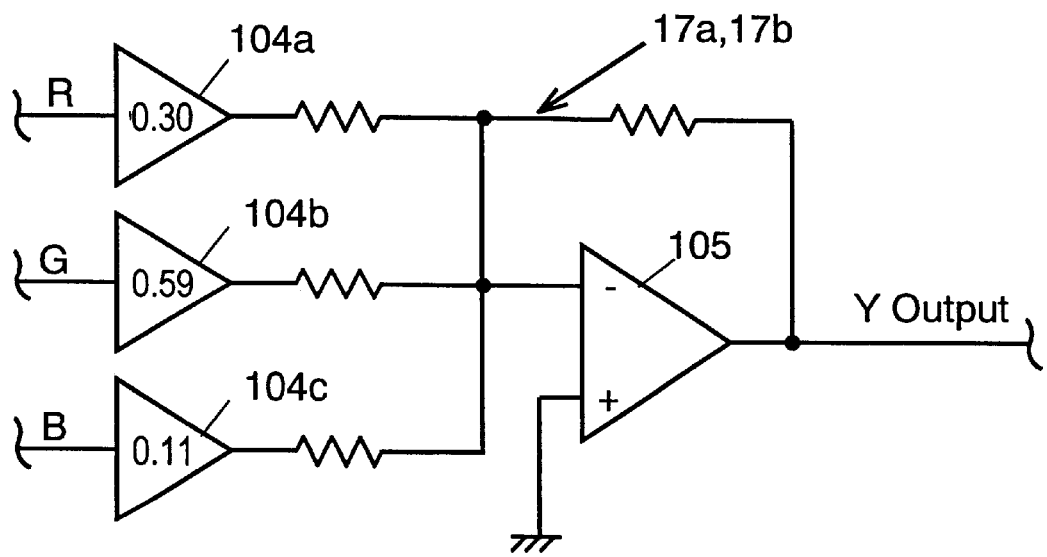

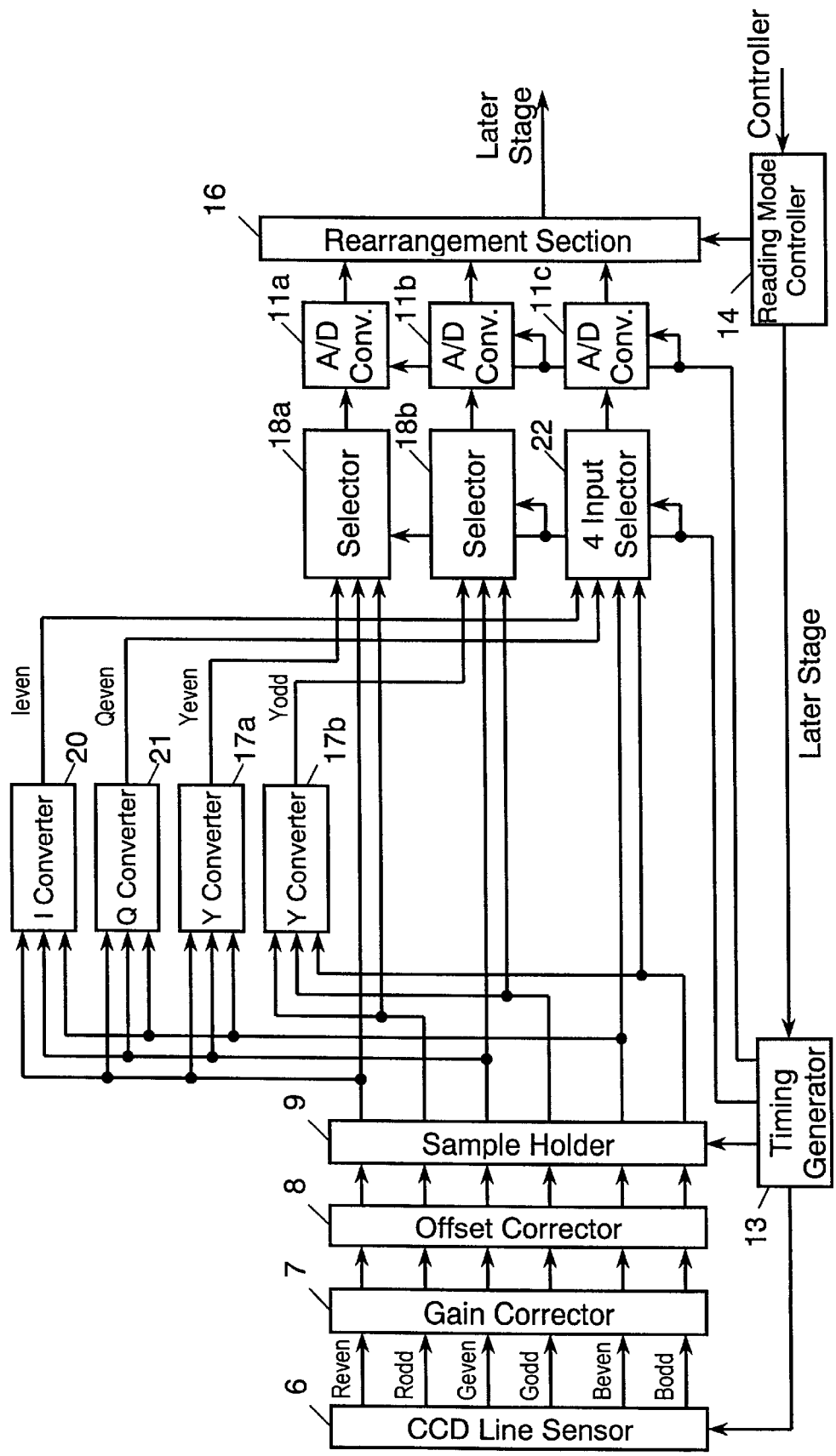

| an | bn | Output |
|----|----|--------|
| 0  | 0  | w      |
| 0  | 1  | x      |
| 1  | 0  | y      |
| 1  | 1  | z      |

| an | Output |
|---|---|
| 0 | xn |
| 1 | yn |

IMAGE READER

THIS APPLICATION IS A U.S. NATIONAL PHASE APPLICATION OF PCT INTERNATIONAL APPLICATION PCT/JP99/01286.

TECHNICAL FIELD

The present invention relates to a color image reading apparatus that efficiently processes analog signals during image reading; more specifically, the apparatus that can read monochrome image at a high speed.

BACKGROUND ART

A major principle of image reading in most recent color image reading apparatus is reading an image with a Charge Coupled Device (hereinafter referred to as CCD) line sensor splitting into the R(red), G(green) and B(blue) color components, and scanning the CCD line sensor in the direction of subsidiary scanning. For increasing the processing speed, the CCD line sensor delivers signals of the respective R, G and B pixels separated into the signal the even-number pixels and that from the odd-number pixels.

The structure and the operation of a conventional image reading apparatus is described in the following. FIG. 17 illustrates a CCD line sensor in a conventional image reading apparatus.

As shown in FIG. 17, a CCD line sensor 6 delivers analog output signals of pixel rows 101a, 101b and 101c corresponding respectively to R, G and B, each separated into the signal from the even-number pixels and that from the odd-number pixels.

FIG. 18 illustrates outline structure of a conventional image reading apparatus, with respect to the optical system and the mechanical section.

The portion of optical system and mechanical section comprises a transparent glass platen 1 for having an original document on the top surface, a lamp 2 for illuminating the document, a mirror 4 for guiding the light reflected from the document to lens 5, a lens 5 for focusing the light reflected by the mirror 4, a CCD line sensor 6 for reading the focused light in terms of electric charges through photoelectric conversion, and a carriage 3 that transfers the CCD line sensor 6, together with the lamp 2, the mirror 4 and the lens 5, in the direction of subsidiary scanning for scanning the lines of document.

FIG. 19 shows a block diagram of an analog data processing sector of a conventional image reading apparatus.

An analog data processing sector of the image reading apparatus comprises, as shown in FIG. 19, a gain corrector 7 for correcting the amplitude of the analog signal outputted from CCD line sensor 6, an offset corrector 8 for correcting the DC potential of the analog output signal, a sample holder 9, a multiplexer 10a, 10b, 10c for time sharing and multiplexing the analog signal, an A/D (analog-digital) converter 11a–11c for converting the analog signal to digital signal, a dropout color selector 12 for selecting a data among the input data in accordance with control signal and outputting the selected data, a timing generator 13 which outputs the timing signal for driving the CCD line sensor 6, the sample holder 9, the multiplexer 10a–10c and the A/D converter 11a–11c in accordance with the output of control signal, and a reading mode controller 14 which delivers control signal for controlling the dropout color selector 12 and the timing generator 13 in accordance with instructions inputted through a CPU (not shown) or an operation panel (not shown) for switching a reading mode, viz. reading in color or in monochrome, and specifying a dropout color for the reading in monochrome.

Descriptions will follow referring to a conventional image reading apparatus shown in FIGS. 18–20. FIG. 20 shows a timing chart at the reading in color mode and the reading in monochrome mode. FIG. 21A shows structure around the multiplexer section in a conventional image reading apparatus. FIG. 21B shows operational logic of the multiplexer of a conventional image reading apparatus.

A document placed on the surface of glass platen 1 is illuminated with the lamp 2. The light reflected from the document is guided by the mirror 4 to the lens 5, and the light focused by the lens 5 is split by R, G and B color filters (not shown) into the R, G and B color components. The respective color components are read by the CCD line sensor 6.

The CCD line sensor 6 is driven by output of the timing generator 13, which generates a certain waveform in accordance with instruction from the reading mode controller 14. Analog signals outputted from the CCD line sensor 6 undergo a correction, in the amplitude and the DC potential, at the gain corrector 7 and the offset corrector 8 to assume a waveform that meets the input width of the A/D converter 11a, 11b, 11c. By the sample hold timing of FIG. 20, only the effective output is held in the sample holder 9.

Analog signals of respective R, G and B outputted from the sample holder 9 are time shared and multiplexed at the multiplexer 10a–10c into the signal of the even-number pixels and that of the odd-number pixels individually, in accordance with the waveform of the multiplexer "an", shown in FIG. 20, under the logic of FIG. 21B. Each of the analog signals outputted from the multiplexer 10a–10c is delivered respectively to the A/D converter 11a–11c to be converted into digital signal, which signal is then delivered to the dropout color selector 12.

In the reading in color mode, the dropout color selector 12 outputs the respective R, G and B digital data through as they are. When reading in monochrome mode, the dropout color selector 12 outputs only a color component designated by the reading mode controller 14.

Assume R is designated as the color for the reading in monochrome mode, then only the R data is outputted. Digital signal outputted from the dropout color selector 12 undergoes a certain predetermined process such as the line correction, chrominance correction, etc., before it is delivered to a later stage.

After the CCD line sensor 6 has read data for one line in a predetermined accumulation time, the carriage 3 moves by one line in the subsidiary scanning. Repeating this operation completes scanning of an entire page of the document.

In the above-described method of the image reading in monochrome mode, a data of the dropout color is selected after the A/D conversion. If R is selected as a dropout color, for example, only the R data is outputted after all of the R, G and B data have been A/D converted.

Namely, the A/D converters involved in the G and B conversion are conducting a useless data conversion. The reading in monochrome mode is generally performed at a speed higher than that in color. This means that the speed required for an A/D converter is faster in the reading in monochrome mode than that in the reading in color mode.

In other words, an A/D converter having a high conversion speed satisfying a speed required for the reading in monochrome is compelled to make a slow conversion at the reading in color mode. Thus, the capacity of A/D converter is partly left idle in an image reading apparatus that has both a color reading mode and a high speed monochrome reading mode. This eventually leads to a higher cost of the apparatus.

The present invention addresses the above drawbacks of the conventional image reading apparatus. The present invention aims to offer an image reading apparatus equipped with both a color reading mode and a high speed monochrome reading mode, in which the dropout color is selected at the stage of analog signal in order not to leave the capacity of an A/D converter partially idle. The image reading apparatus of the above structure can read an image at a high speed, yet at a low cost.

DISCLOSURE OF THE INVENTION

An image reading apparatus of the present invention comprises:

selecting means that outputs, for the reading in color mode, the analog signals of respective color components delivered from sample holding means after time sharing and multiplexing the signal of even-number pixels and that of odd-number pixels individually, while for the reading in monochrome mode, analog signal of selected color component, or luminance signal generated from the analog signals of respective color components delivered from the sample holding means, separated in the row of even-number pixels and the row of odd-number pixels;

signal converting means for converting the analog signal multiplexed in the selecting means into digital signal, or converting analog signals of the even-number pixels and the odd-number pixels that have been individually outputted into digital signals respectively; and rearranging means that outputs, in case of the reading in color mode, the digital signals converted by the signal converting means as they are, while in case of the reading in monochrome mode, rearranges the digital data rows that have been separated into that of even-number pixels and that of odd-number pixels into a single sequential data row.

By the above processing, the speed of an A/D converter may stay low even when the reading in monochrome mode is conducted at a speed higher than that in color mode. For example, if the reading in monochrome mode is conducted twice as fast that in color mode, the A/D conversion may be performed at the same speed as in the reading in color mode.

BRIEF DESCRIPTION OF THE DRAWINGS

FIG. 7A illustrates a block diagram around multiplexer of the image reading apparatus of embodiment 2.

FIG. 7B exhibits the operational logic of the multiplexer.

FIG. 8 is a circuit diagram of Y converter provided in the image reading apparatus of embodiment 2.

FIG. 11 illustrates a block diagram of analog data processing sector in an image reading apparatus in accordance with a third exemplary embodiment of the present invention.

DETAILED DESCRIPTION OF THE INVENTION

Exemplary embodiments of the present invention will be described in the following with reference to FIG. 1 through FIG. 16. In these drawings, those portions having the same functions are represented by using the same symbols, and repetitive description on which is omitted.

Embodiment 1

Figure 1:
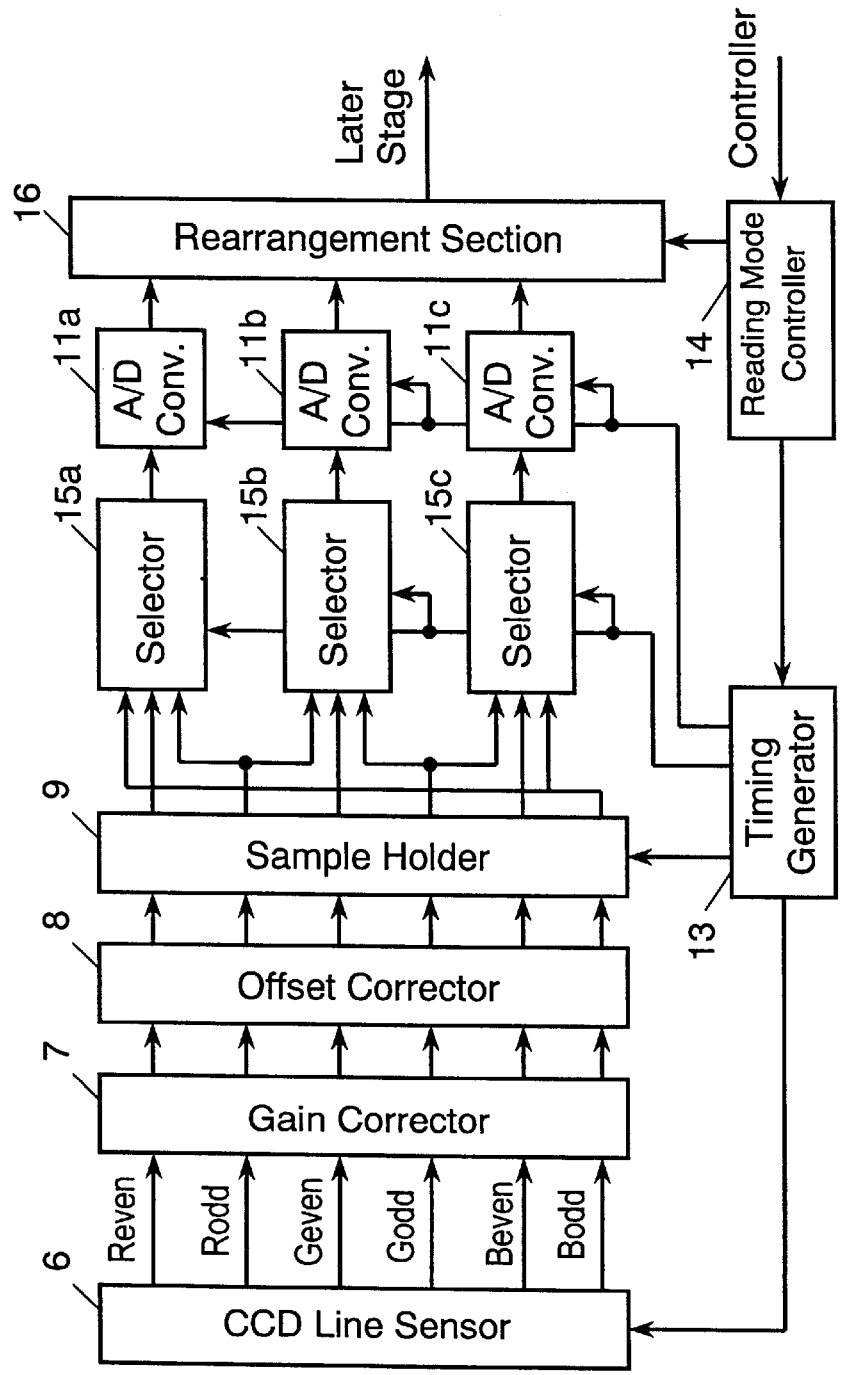
FIG. 1 illustrates a block diagram of analog data processing sector in an image reading apparatus in accordance with a first exemplary embodiment of the present invention.
Figures 2A, 2B:
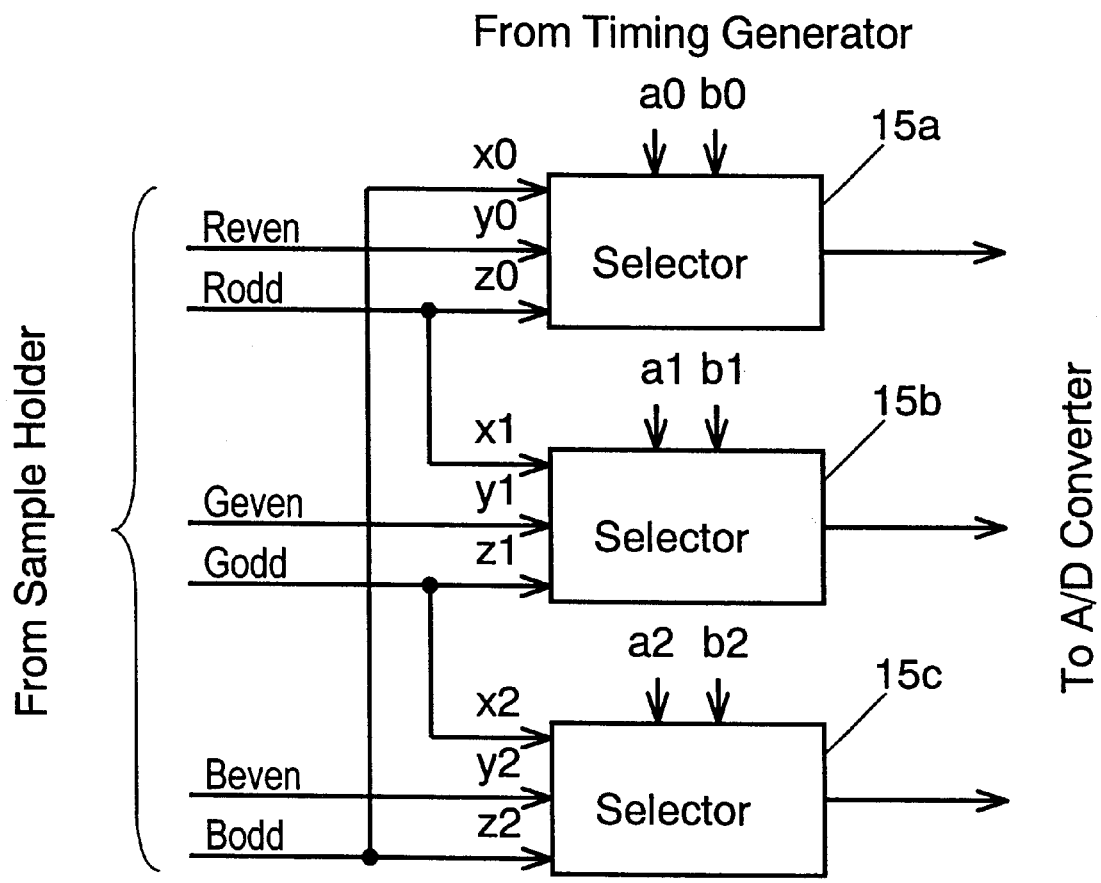
FIG. 2A illustrates a block diagram around selector of the image reading apparatus of embodiment 1.
FIG. 2B exhibits the operational logic of the selector.
Figure 3:
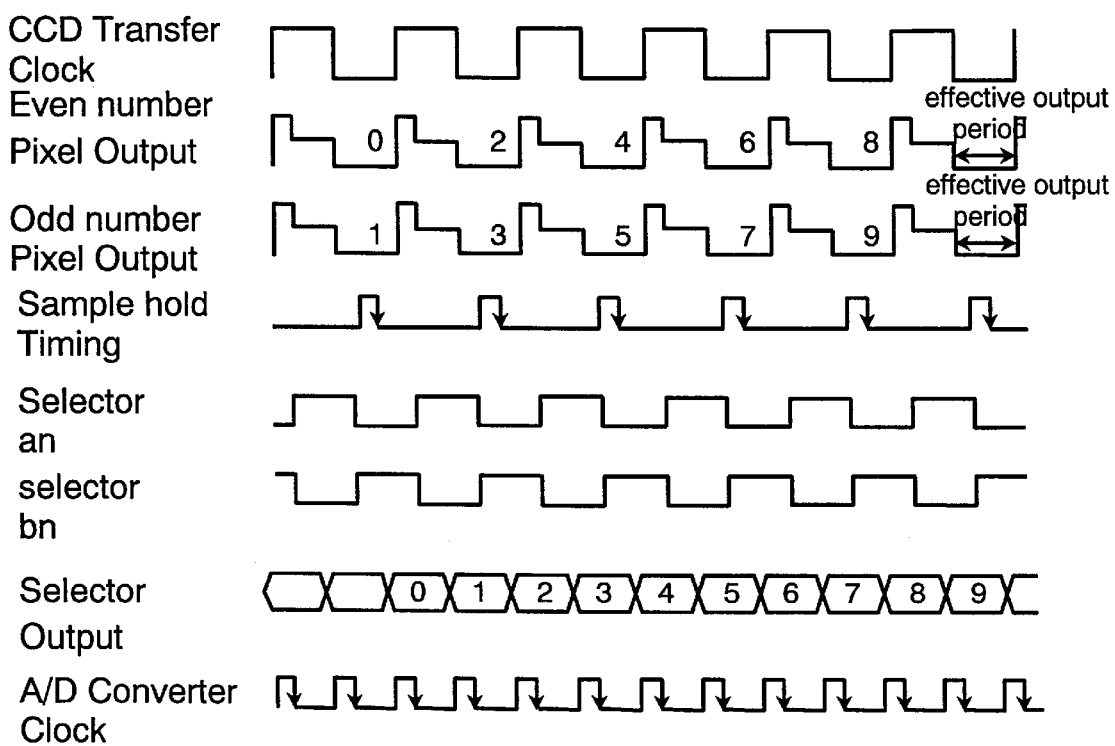
FIG. 3 illustrates a timing chart for the reading in color mode in the image reading apparatus of embodiment 1.
Figure 4:
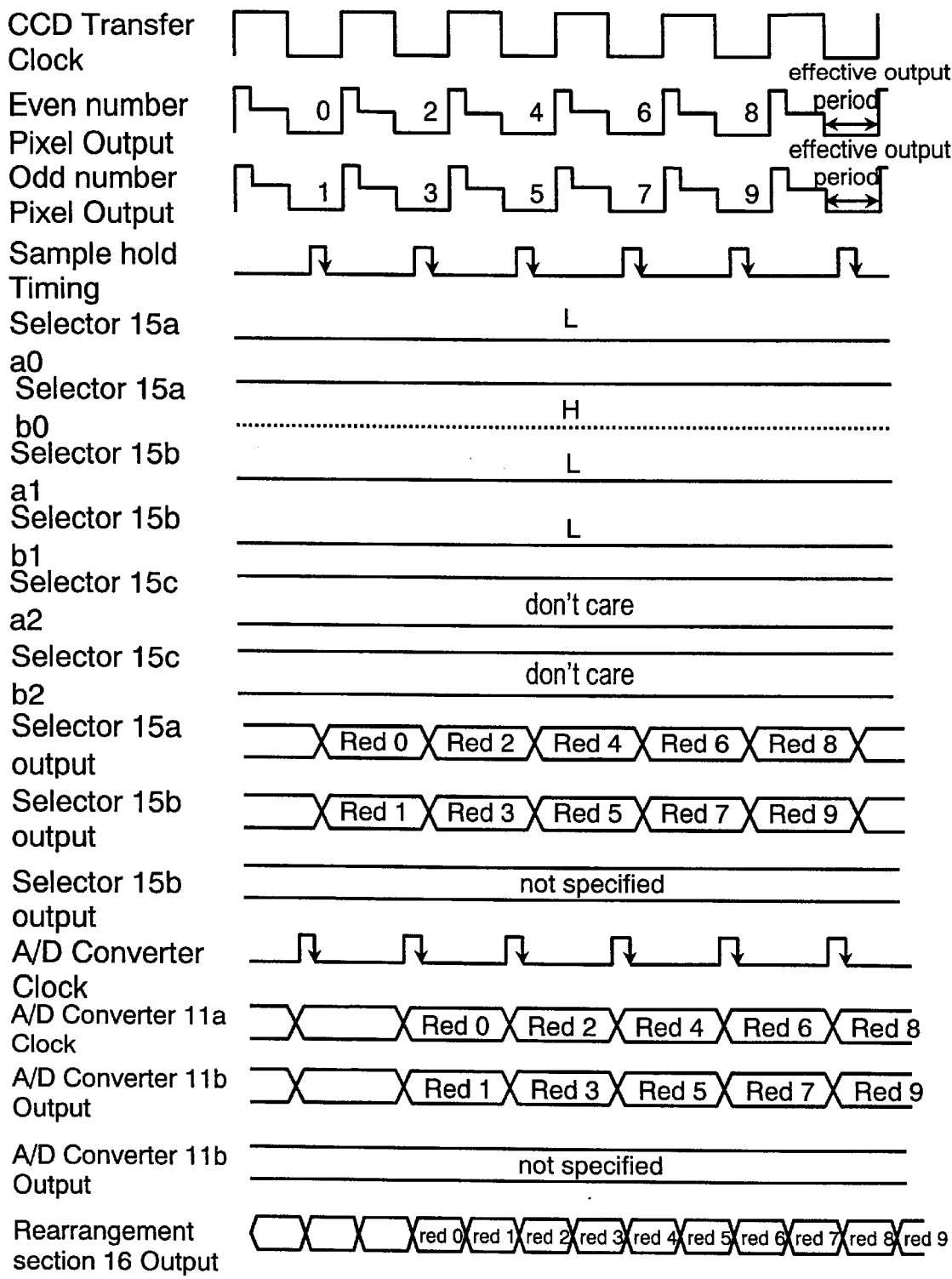
FIG. 4 illustrates a timing chart for the reading in monochrome in the image reading apparatus of embodiment 1.

FIG. 1 illustrates a block diagram of an analog data processing sector in an image reading apparatus in accordance with a first exemplary embodiment of the present invention. FIG. 2A shows structure around the selector section of the image reading apparatus of the present embodiment 1, FIG. 2B exhibits the operational logic of the selector section. FIG. 3 is a timing chart for reading in the color mode by the image reading apparatus of embodiment 1. FIG. 4 is a timing chart for reading in the monochrome mode by the image reading apparatus of embodiment 1.

As shown in FIG. 1, an analog data processing sector of the image reading apparatus in accordance with the present exemplary embodiment 1 comprises a gain corrector 7 for correcting the amplitude of analog signal outputted from the CCD line sensor 6, an offset corrector 8 for correcting the DC potential of analog output signal, a sample holder 9 for holding only the effective signal corrected by the gain corrector 7 and the offset corrector 8, a selector (selecting means) 15a–15c for outputting analog signals that have been time shared and multiplexed, or one selected signal, an A/D converter (signal conversion section) 11a–11c for converting analog signal to digital signal, a rearrangement section 16 for rearranging digital data outputted from the A/D conversion section 11a–11c, a timing generator 13 that generates a timing for driving the CCD line sensor 6, the sample holder 9, the selector 15a–15c and the A/D converter 11a–11c in accordance with the output control signal, and a reading mode controller 14 which delivers control signal for controlling the rearrangement section 16 and the timing generator 13 in accordance with a signal from a CPU (not shown) or an operation panel (not shown) for switching a reading mode, viz. the reading in color mode/in monochrome mode, and specifying a dropout color for the reading in monochrome mode.

Figure 17:
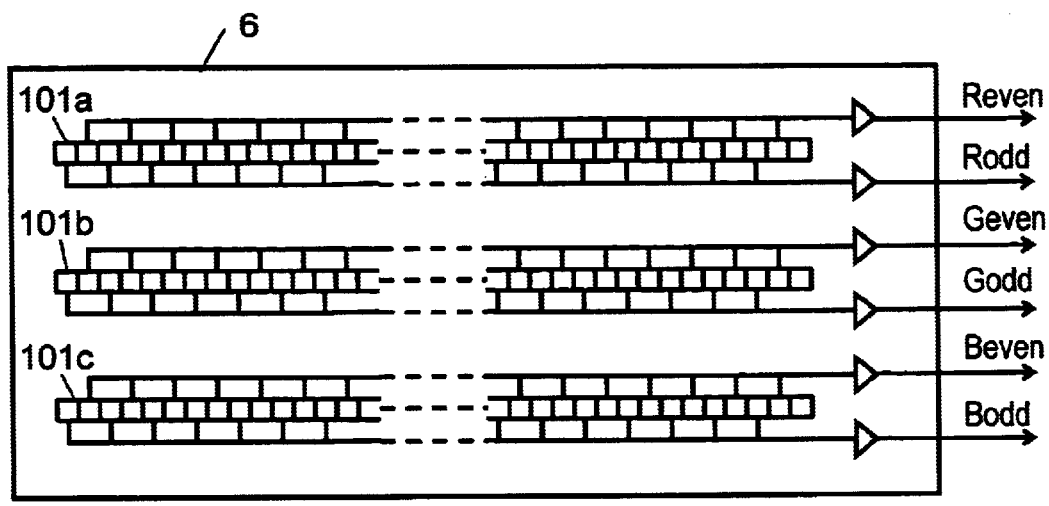
FIG. 17 shows outline concept of a CCD line sensor provided in a conventional image reading apparatus.
Figure 18:
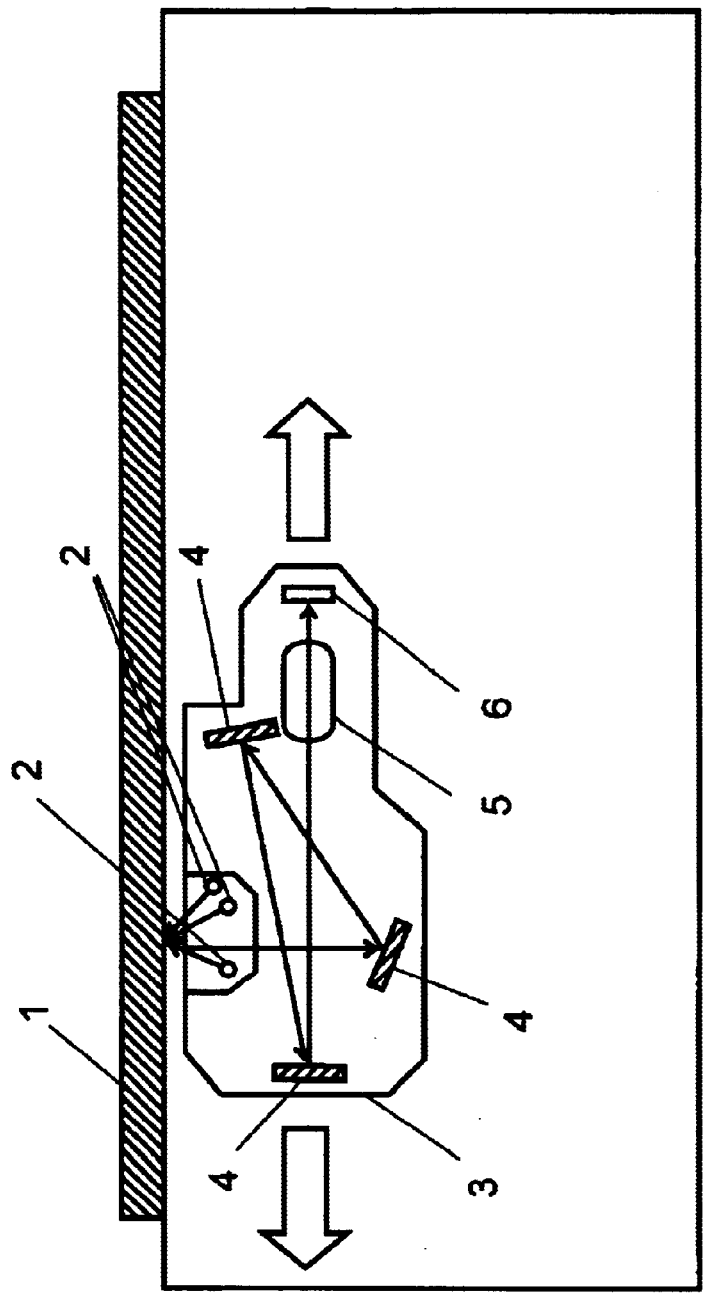
FIG. 18 illustrates outline structure of a conventional image reading apparatus, in the optical system and the carriage mechanism.
Figure 19:
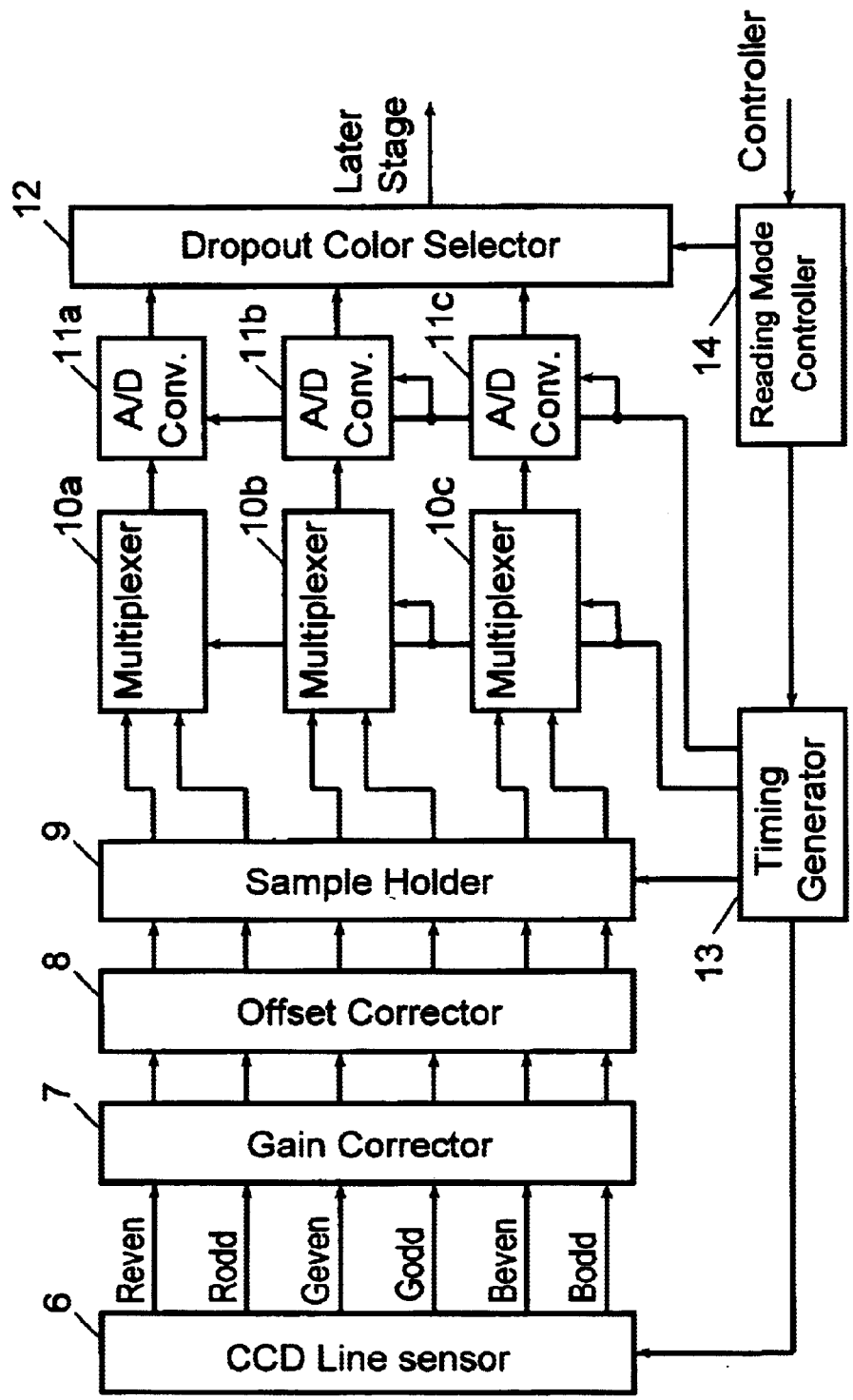
FIG. 19 illustrates a block diagram of analog data processing sector in a conventional image reading apparatus.
Figure 20:
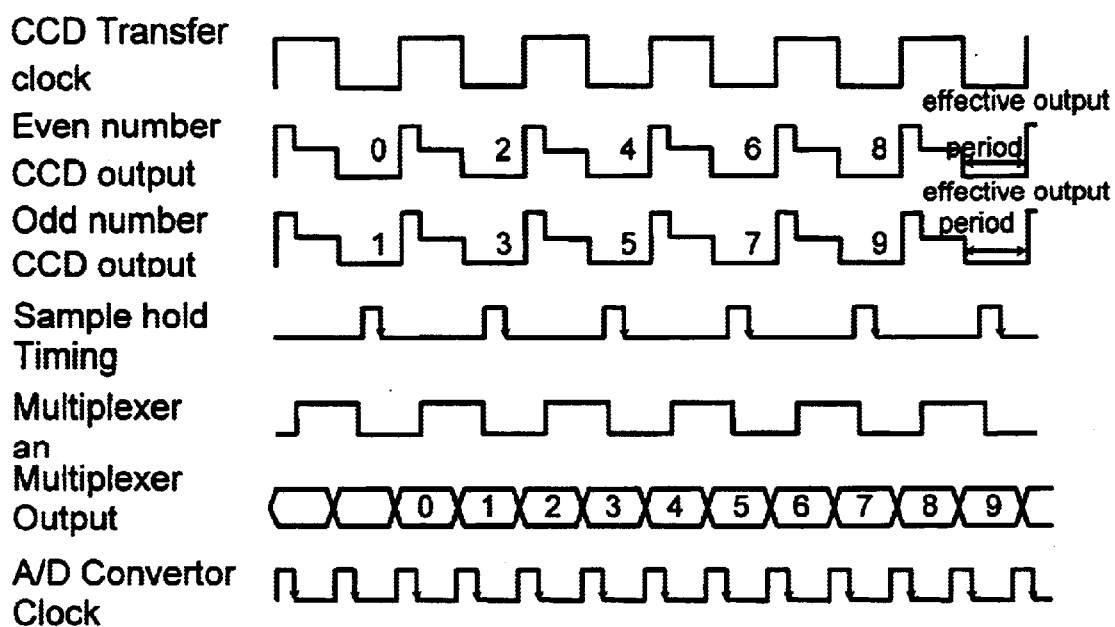
FIG. 20 shows a timing chart for processing of the color data and monochrome data in a conventional image reading apparatus.
Figures 21A, 21B:
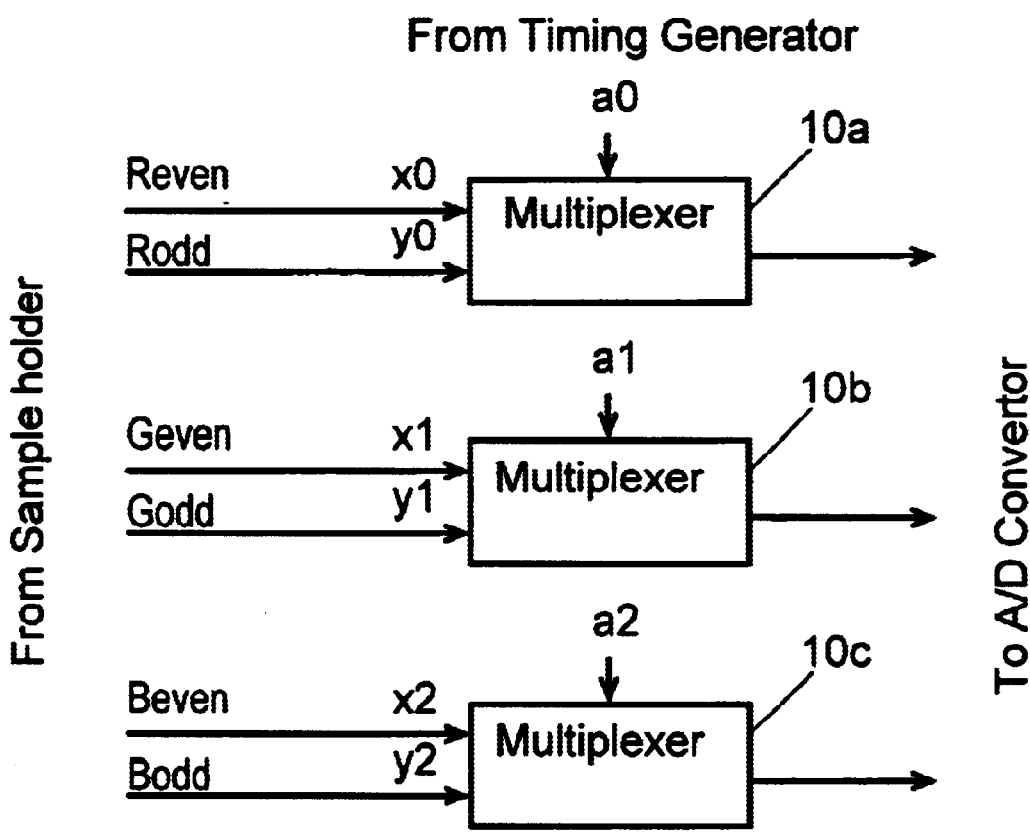
FIG. 21A illustrates a block diagram around multiplexer of a conventional image reading apparatus.
FIG. 21B exhibits the operational logic of the conventional multiplexer.

The structures of the CCD line sensor, and the optical section and the mechanism of an image reading apparatus of the present embodiment 1 remain substantially the same as those of the conventional counterparts described and shown in FIG. 17 and FIG. 18. Therefore, the description of these is omitted here.

A data reading in the present image reading apparatus will be described in the following with reference to FIG. 1 through FIG. 4 and FIG. 18.

Referring to FIG. 18, a document placed on the surface of the glass platen 1 is illuminated with a lamp 2. The light reflected from the document is guided by the mirror 4 to lens 5, and the light focused by the lens 5 is split by the R, G and B color filters (not shown) into R, G and B color components, for the reading by the CCD line sensor 6.

The CCD line sensor 6 is driven by a CCD transfer clock signal delivered from the timing generator 13, which generates a certain waveform in accordance with output of the reading mode controller 14 (FIG. 1). Analog signal outputted from the CCD line sensor 6 is corrected at the gain corrector 7 and the offset corrector 8 with respect to the amplitude and the DC potential to a waveform meeting the input width of the A/D converter. The sample holder 9 only holds the effective output.

Now in the following, the reading in color mode and the reading in monochrome mode will be described.

FIG. 3 is a timing chart for the reading in color mode. In the reading in color mode, the respective R, G and B signals from the CCD in the even-number pixels and the odd-number pixels are held individually in accordance with respective sample hold timings. In the selector 15a–15c, the analog signals outputted from the sample holder 9 are time shared and multiplexed, with respect to each of the R, G and B color components, in accordance with the waveform shown in FIG. 3, selected under the logic of FIG. 2B.

The multiplexed analog signal outputted from the selector 15a–15c is delivered to the respective A/D conversion section 11a–11c. There, the signals are converted into digital signals in synchronization with clock of the A/D conversion section, and delivered to the rearrangement section 16.

In case of the reading in color mode, the rearrangement section 16 outputs the digital data as they are, because the output from the A/D converter 11a–11c has respective R, G, B components that have already been arranged in the order of pixels. The output from the rearrangement section 16 undergoes a certain predetermined processing such as the line correction, chrominance correction, etc., before it is sent to a later stage.

A timing chart for the reading in monochrome mode is shown in FIG. 4. In this example, the color R has been selected as the dropout color.

In the reading in monochrome mode, the analog signal delivered from the sample hold section 9 is selected, at the selector 15a with the row of even-number pixels of R (Reven), in accordance with the waveform shown in FIG. 4, selected under the logic of FIG. 2B; at the selector 15b with the row of odd-number pixels of R (Rodd). While, the output of the selector 15c is not used as image data; therefore, the selector may output any data, or may not output any data.

Output of the selector section 15a is delivered to the A/D converter 11a, output of the selector 15b is delivered to the A/D converter 11b, these are converted respectively into digital signals. Namely, the A/D converter 11a converts only the signal of the R even pixels, while the A/D converter 11b converts only that of the R odd pixels.

Data delivered to the A/D converter 11c is not used; or any data may be entered there. Therefore, the A/D converter 11c may conduct an A/D conversion for outputting a digital signal, or it may not conduct any A/D conversion.

Digital data of the A/D converter 11a, 11b are delivered to the rearrangement section 16; where, the data rows separated into the even-numbered pixels and the odd-numbered pixels are recombined into a sequentially arranged single row of data. Output of the rearrangement section 16 undergoes a certain predetermined processing, such as the line correction, etc., before it is delivered to a later stage.

After the CCD line sensor 6 has read data for one line in a certain accumulation time, the carriage 3 moves by one line in the subsidiary scanning. Repeating this operation completes scanning of an entire page of the document.

Now in the following, description is made on the reading speed of the readings in color mode and in monochrome mode with an image reading apparatus of the present embodiment 1. It is generally expected that the reading in monochrome mode should be faster than in color mode. This expectation seems to be coming from a simple belief that an operation in down-graded requirements should be easier, therefore faster; while, on the other hand, there is a practical need that, because a data printer operates faster in the monochrome mode than in the color mode, an image reader is requested to follow.

Assume the accumulation time per one line needed for the reading in color mode to be 19.8 msec., number of pixels per one line to be 4960 pixels, then the pixel output cycle per one signal is 8 $\mu$sec.; because the CCD line sensor outputs the respective R, G and B components dividing these in the even-number pixels and the odd-number pixels.

As the pixel output cycle per one signal of the CCD line sensor 6 is 8 $\mu$sec., the pixel output cycle at selector section 15a, 15b, 15c is 4 $\mu$sec., after the time sharing and multiplexing of the even-number pixels and the odd-number pixels. Namely, the conversion speed needed for the A/D conversion section 11a, 11b, 11c is 250 ksps (Kilo Sampling Per Second).

In a case where the reading in monochrome is conducted at a speed twice as fast as that in color, viz. the monochrome reading completes in half the time, the accumulation time per one line is 8.2 msec., the pixel output cycle per one signal of the CCD line sensor 6 turns out to be 4 $\mu$sec. When, as the output of the selector section 15a–15c is delivered at a cycle of the same speed as the output cycle of the CCD line sensor 6, the pixel output cycle is 4 μsec. Namely, the conversion speed needed for the A/D conversion section 11a–11c is 250 ksps., or the same speed as that in color.

As described in the foregoing, the reading in monochrome mode is conducted by an image reading apparatus of the present embodiment 1 in the following manner: the selector 15a and 15b respectively select the even-number R pixel row and the odd-number R pixel row, both being the dropout color R, for the processing on separate arrangements, and then the rearrangement section 16 recombines these pixel rows that have been A/D converted separately at the A/D conversion sections 11a and 11b. Therefore, even in an image reading apparatus that is equipped with both the color reading mode and the high speed monochrome reading mode, the speed of A/D conversion can be suppressed at a low level.

In the present exemplary case, even if the reading in monochrome mode is conducted at a speed twice as high that in color mode, the A/D conversion for monochrome reading may be performed at the same speed needed for the reading in color mode.

Embodiment 2

Figure 5:
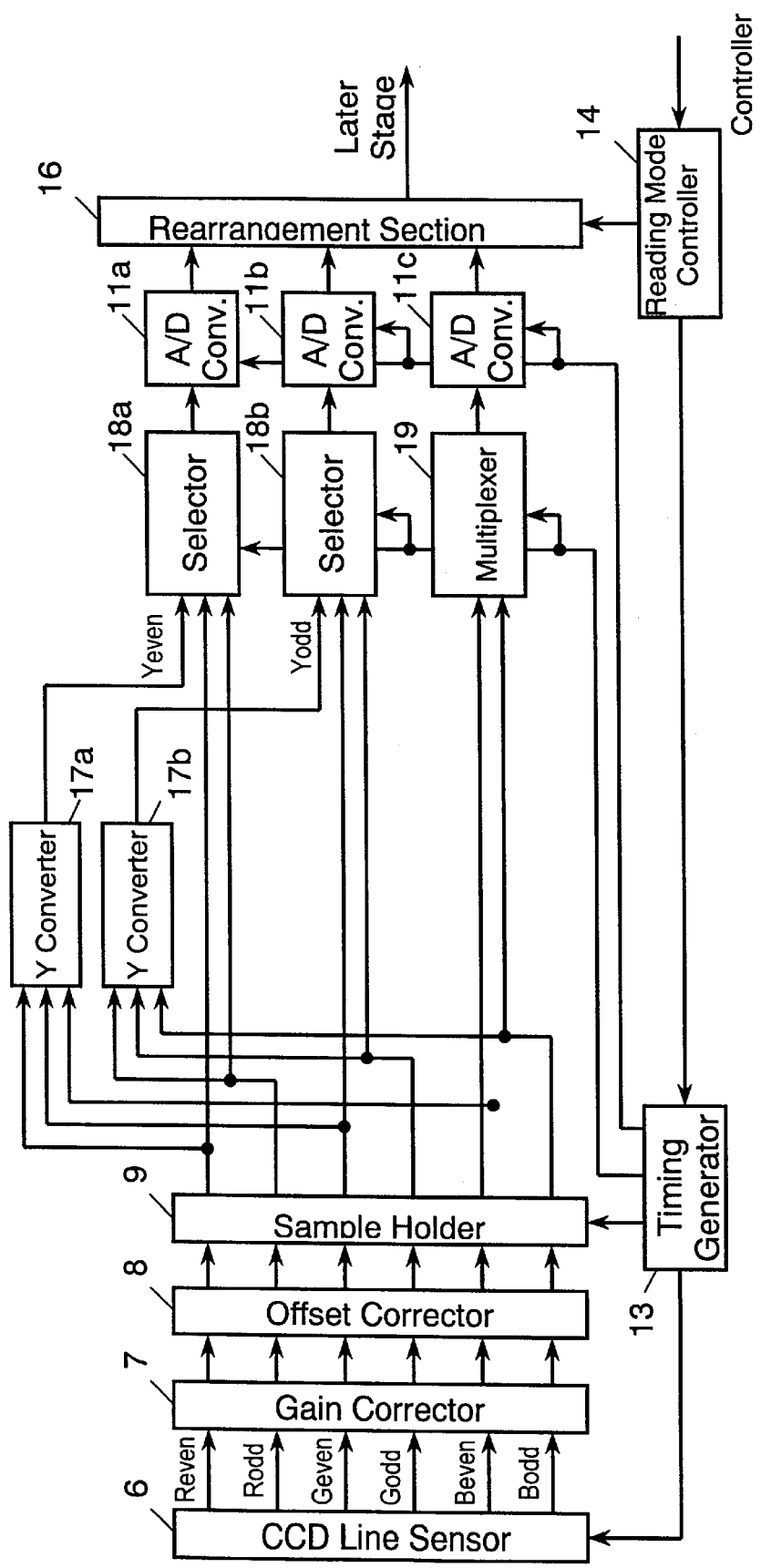
FIG. 5 illustrates a block diagram of analog data processing sector in an image reading apparatus in accordance with a second exemplary embodiment of the present invention.
Figures 6A, 6B:
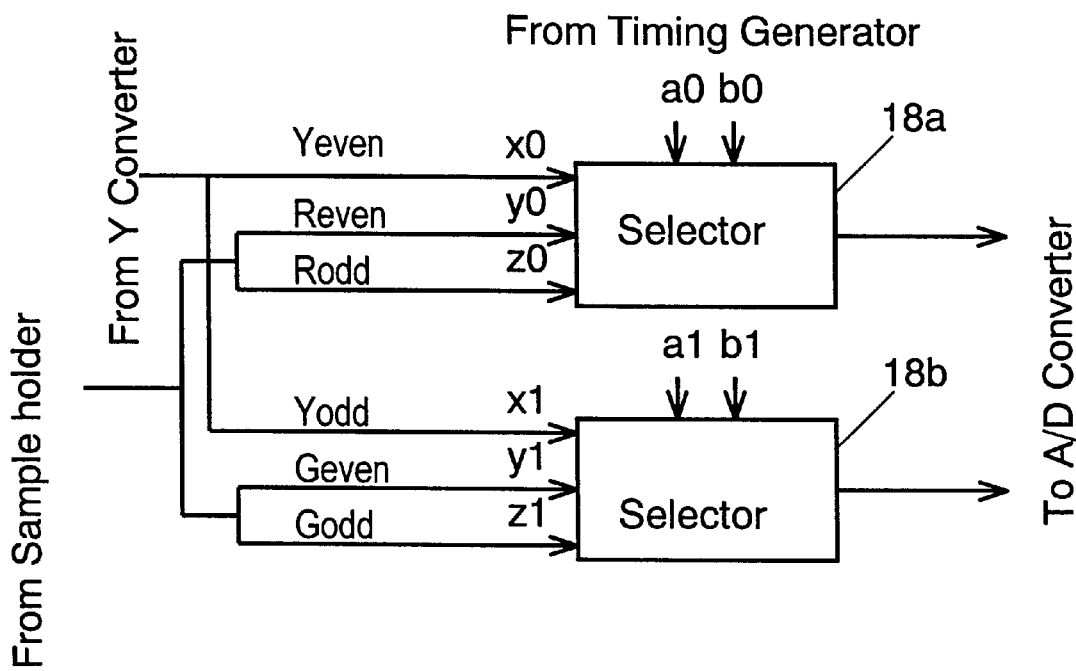
FIG. 6A illustrates a block diagram around selector of the image reading apparatus of embodiment 2.
FIG. 6B exhibits the operational logic of the selector.
Figure 9:
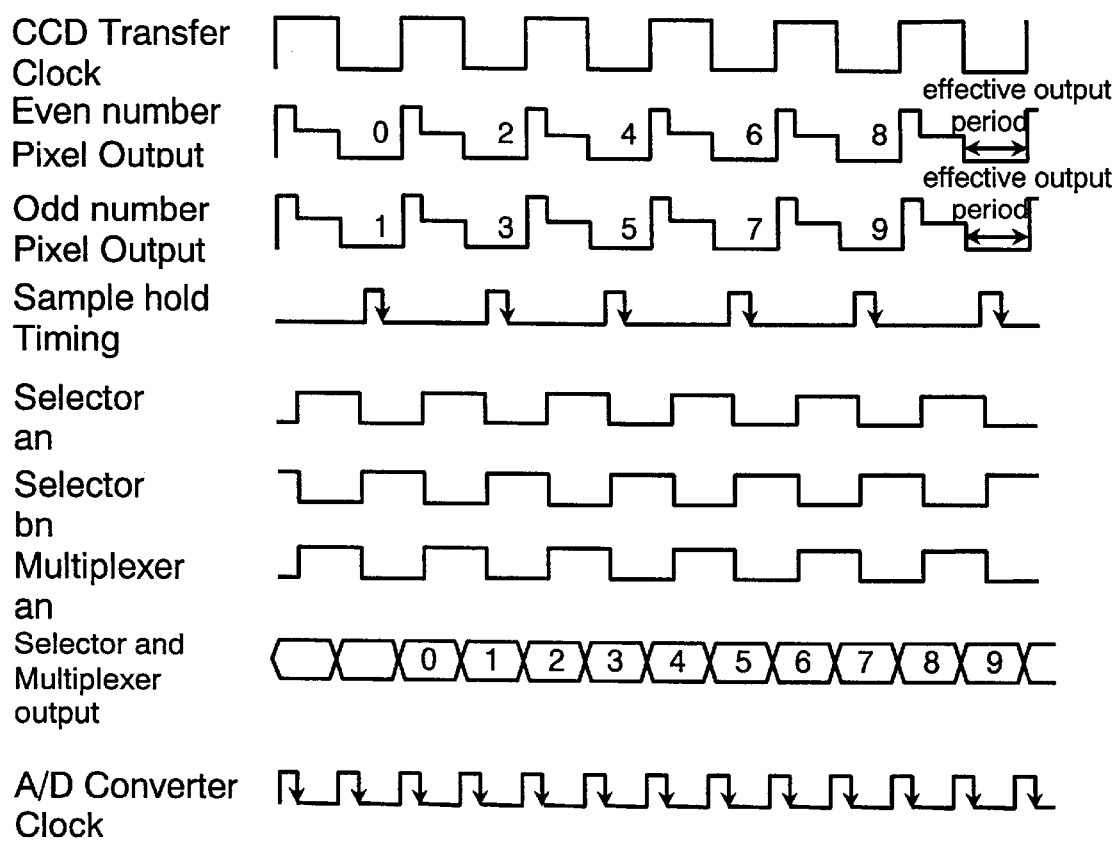
FIG. 9 shows a timing chart for the reading in color mode in the image reading apparatus of embodiment 2.
Figure 10:
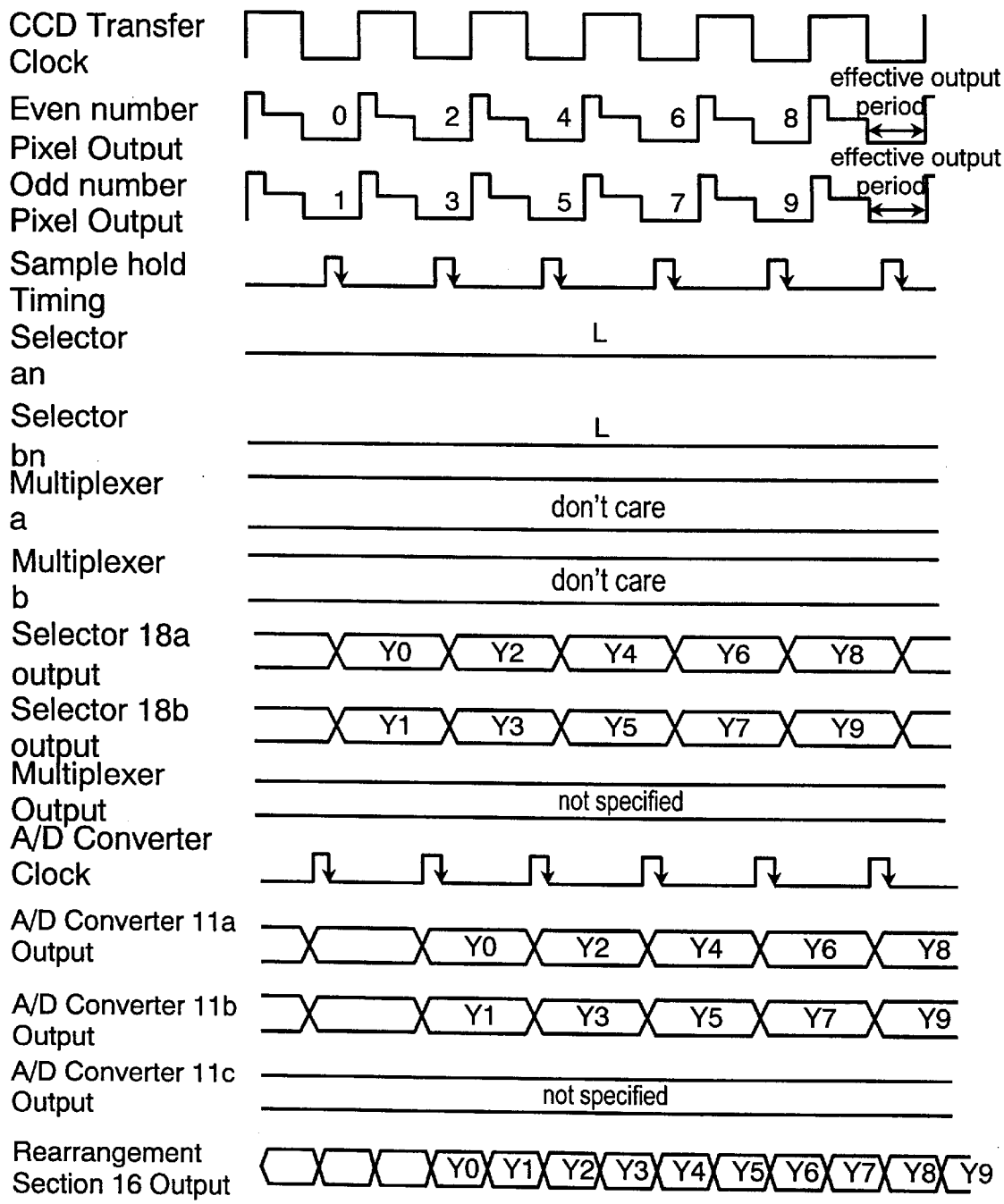
FIG. 10 shows a timing chart for the reading in monochrome mode in the image reading apparatus of embodiment 2.

FIG. 5 shows structure of analog data processing sector in an image reading apparatus in accordance with a second exemplary embodiment of the present invention. FIG. 6A shows structure around selector of the image reading apparatus of the present embodiment 2, FIG. 6B exhibits the operational logic of the selector section. FIG. 7A shows structure around multiplexer of the image reading apparatus of embodiment 2, FIG. 7B exhibits operational logic of the multiplexer. FIG. 8 is a circuit diagram of Y converter provided in the image reading apparatus of the present embodiment 2. FIG. 9 is a timing chart for the reading in color mode in the image reading apparatus of embodiment 2. FIG. 10 is a timing chart for the reading in monochrome mode in the image reading apparatus of embodiment 2.

As shown in FIG. 5, an analog data processing sector of the image reading apparatus in accordance with exemplary embodiment 2 comprises a gain corrector 7, an offset corrector 8, a sample holder 9, an A/D converter 11a–11c, a timing generator 13, a reading mode controller 14, and a rearrangement section 16; furthermore, it contains a selector (selecting means) 18a, 18b (details of which are shown in FIG. 6) for outputting the analog signal after time sharing and multiplexing an input signal, or selecting one output signal, a multiplexer (selecting means) 19 for outputting the analog signal after time sharing and multiplexing, and Y converters (luminance converter) 17a, 17b that converts the R, G, B data into luminance (Y) data. The Y converters 17a, 17b are, as shown in FIG. 8, formed of a constant gain amplifiers 104a–104c and an operating amplifier 105.

The structures of the CCD line sensor, and the optical section and the mechanism of an image reading apparatus in accordance with the present embodiment 2 remain substantially the same as those of conventional counterparts described and shown earlier in FIG. 17 and FIG. 18. Therefore, no description on these items are made here.

A data reading in an image reading apparatus of the present exemplary embodiment 2 will be described in the following with reference to FIG. 5, showing a block diagram, and FIG. 9 and FIG. 10, both being timing charts.

In the same manner as in embodiment 1, a document is read by the CCD line sensor 6, analog signal outputted from the CCD line sensor 6 is corrected at the gain corrector 7 and the offset corrector 8 with respect to the amplitude and the DC potential to a waveform meeting the input width of the A/D converter 11a–11c. The sample holder 9 only holds the effective signal.

In the following, the reading in color mode and the reading in monochrome mode will be described.

In the reading in color mode, the respective R, G and B signals from the CCD in the even-numbered pixels and the odd-numbered pixels are held individually in accordance with respective sample hold timings of FIG. 9. In the selector section 18a, 18b and the multiplex section 19, the analog signals outputted from the sample hold section 9 are time shared and multiplexed, with respect to each of the R, G and B color components, in accordance with the waveform shown in FIG. 9, selected under the logics of FIG. 6B and FIG. 7B. However, the inputs from Y converter 17a, 17b are not selected.

The analog signals from the even-number pixels and the odd-number pixels, time shared and multiplexed in the selector section 18a, 18b and the multiplex section 19 are delivered respectively to the A/D converter 11a–11c. These are converted into digital signals, and then delivered to the rearrangement section 16. In case of the reading in color mode, the rearrangement section 16 outputs the digital data as they are, as the outputs from the A/D converter 11a–11c are provided with respective R, G, B components that have been arranged in the order of pixels. The output from rearrangement section 16 undergoes certain predetermined processing such as the line correction, chrominance correction, etc., before it is sent to a later stage.

In the reading in monochrome mode, the output signals from the even-number pixels and that from the odd-number pixels of respective R, G and B CCDs are sample held in accordance with the respective sample hold timing of FIG. 10. The analog signals outputted from sample holder 9 are delivered as follows: the even-number pixel rows of R, G and B are to the Y converter 17a, the odd-number pixel rows of R, G and B are to the Y converter 17b.

The R, G and B analog signals delivered to the Y converters 17a, 17b are amplified at a certain predetermined gain and added, to be converted into Y signal. The analog signals outputted from the Y converters 17a, 17b are selected, at the selector 18a, with the Y even-number pixel row in accordance with the waveform shown in FIG. 10, under the logic of FIG. 6(b); at the selector section 18b, with the Y odd-number pixel row. These are delivered as outputs. The output of multiplexer 19 is not used as image data; therefore, the multiplexer 19 may output any data, or may not output any data.

Output signal of the selector 18a is delivered to the A/D converter 11a, while output of the selector 18b is delivered to the A/D converter 11b, to be converted respectively into digital signals. Namely, the A/D converter 11a takes part of converting only Y of the even-number pixels, while the A/D conversion section 11b takes part of converting only Y of the odd-number pixels. Data delivered to the A/D converter 11c is not used; or any data may be entered there. Therefore, the A/D converter 11c may conduct an A/D conversion to output a digital signal, or it may not conduct any A/D conversion.

Digital data of the A/D converters 11a, 11b are delivered to the rearrangement section 16; where, the data rows that have been separated into the even-number pixels and the odd-number pixels are recombined in a sequentially arranged single row of data. Output of the rearrangement section 16 undergoes a certain predetermined processing, before it is delivered to a later stage.

After the CCD line sensor 6 has read data for one line in a certain accumulation time, the carriage 3 moves by one line in a subsidiary scanning. Repeating this operation completes scanning of an entire page of the document.

Next, description is made on the speed of the readings in color mode and in monochrome mode with an image reading apparatus of the present exemplary embodiment 2. It is generally expected that the reading in monochrome mode should be faster than in color mode.

Assume the accumulation time per one line needed for the reading in color to be 19.8 msec., number of pixels per one line to be 4960 pixels; the pixel output cycle per one signal is 8 $\mu$sec., as the CCD line sensor outputs the respective R, G and B components separated in the even-number pixels and the odd-number pixels.

As the pixel output cycle per one signal of the CCD line sensor 6 is 8 $\mu$sec., the pixel output cycle at selectors 18*a*, 18*b* and the multiplexer 19 turns out to be 4 $\mu$sec., after the time sharing and multiplexing of the even-number pixels and the odd-number pixels. Namely, the conversion speed needed for the A/D converters 11*a*, 11*b*, 11*c* is 250 ksps.

In a case where the reading in monochrome mode is conducted at a speed twice as fast that in color mode, viz. the monochrome reading completes in half the time, the accumulation time per one line is 8.2 msec., the pixel output cycle per one signal of the CCD line sensor 6 is 4 $\mu$sec. When, as the selectors 18*a*, 18*b* deliver the output at a cycle of the same speed as the output cycle of CCD line sensor 6, the pixel output cycle turns out to be 4 $\mu$sec. Namely, the conversion speed needed for the A/D converters 11*a*, 11*b*, 11*c* is 250 ksps., or the same speed as that in color mode.

In the present image reading apparatus of embodiment 2, even when the reading in monochrome mode is conducted at a speed twice as high that in color mode, A/D conversion for the monochrome reading may be performed at the same speed needed for the reading in color, because the R, G and B signals have already been converted at the analog stage into Y signals by the Y converters 17*a*, 17*b*, and no dropout color is generated.

Embodiment 3

Figures 12A, 12B:
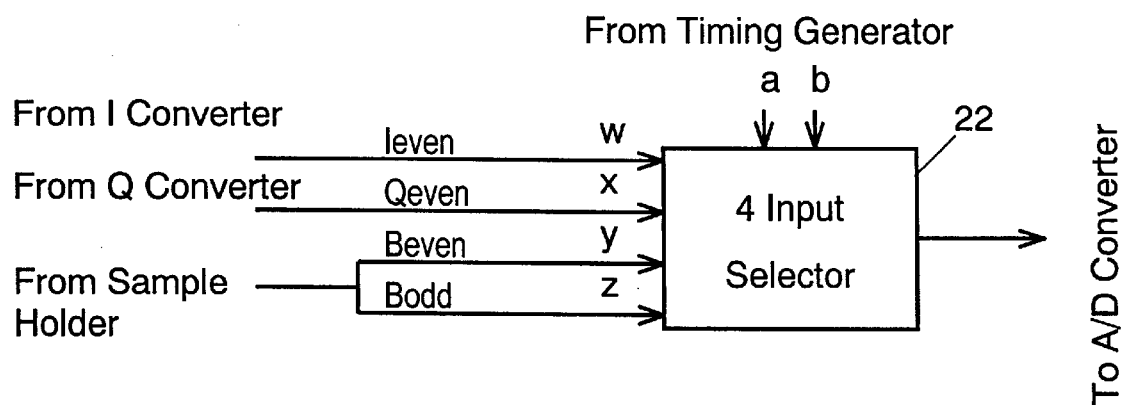
FIG. 12A illustrates a block diagram around four-input selector of the image reading apparatus of embodiment 3.
FIG. 12B exhibits the operational logic of the four-input selector.
Figure 13:
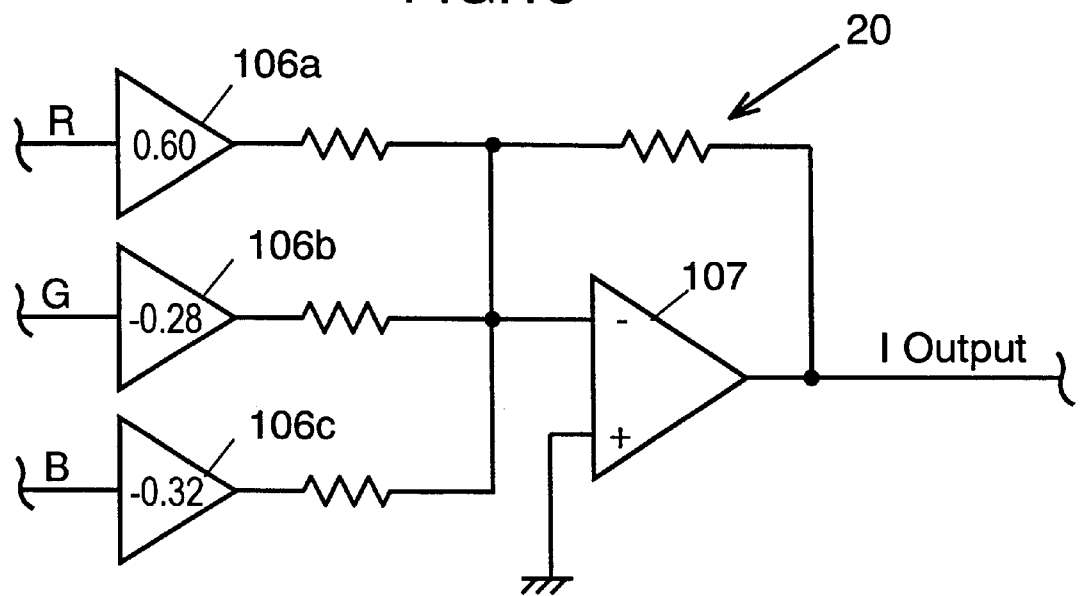
FIG. 13 is a circuit diagram of I converter in the image reading apparatus of embodiment 3.
Figure 14:
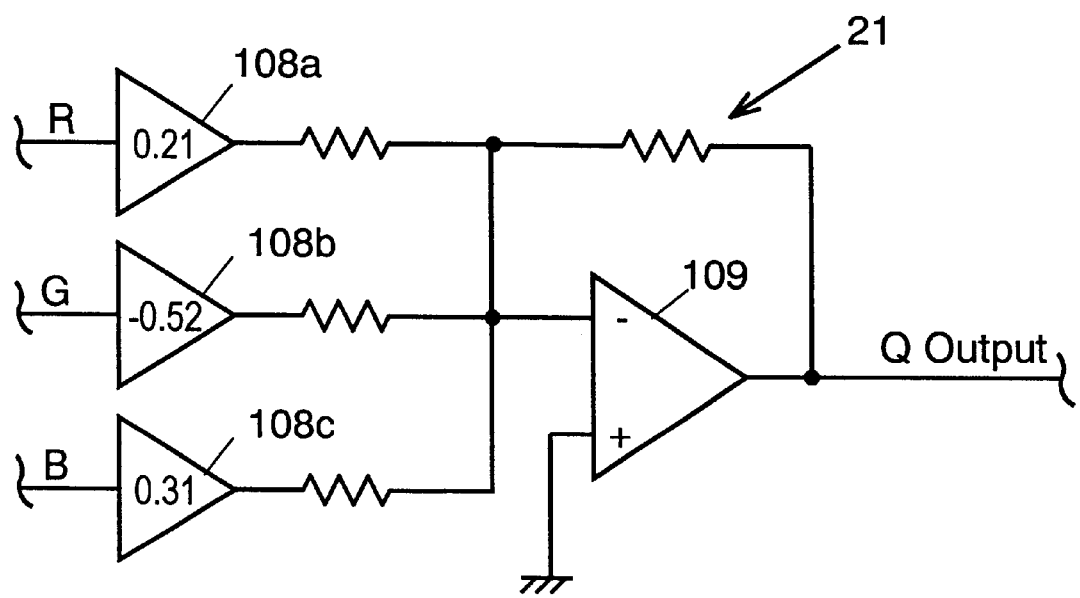
FIG. 14 is a circuit diagram of Q converter of the image reading apparatus of embodiment 3.
Figure 15:
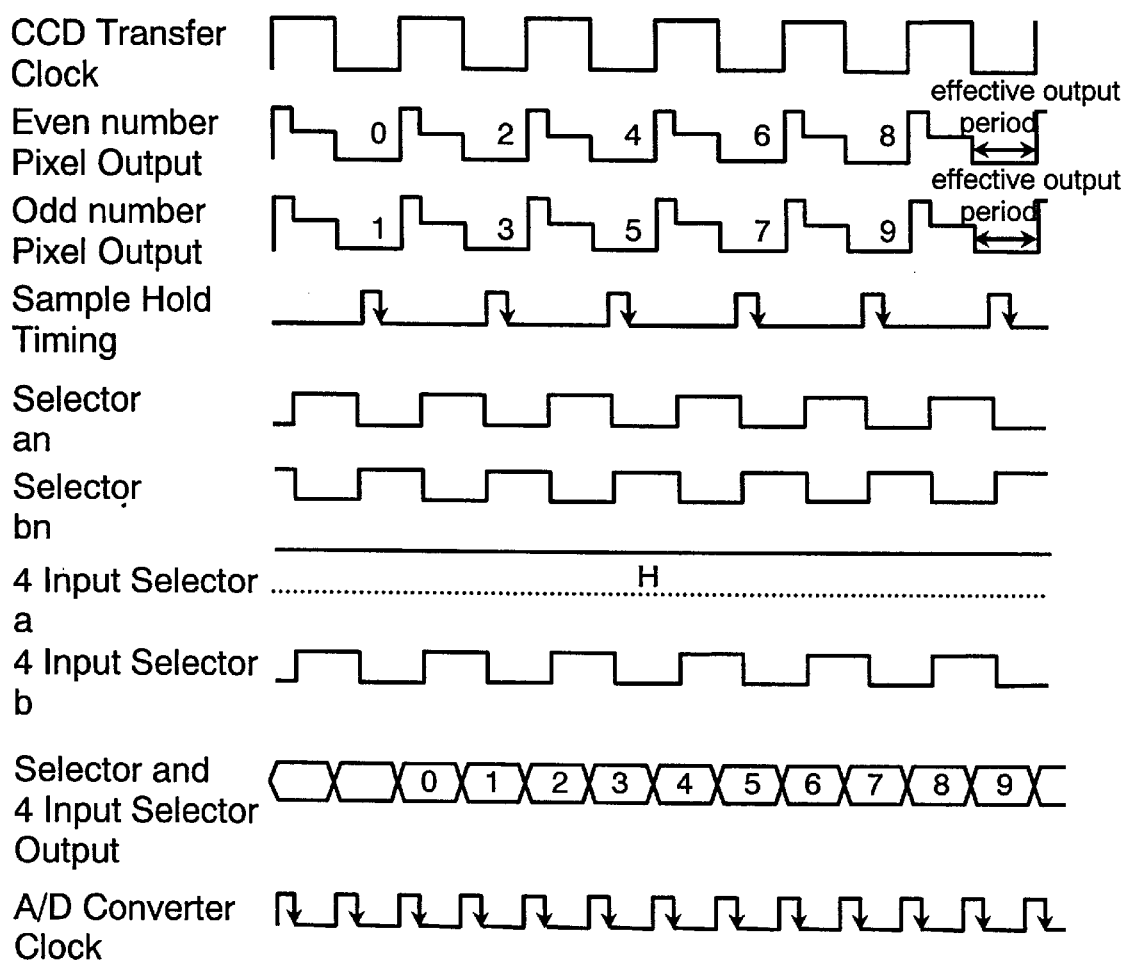
FIG. 15 shows a timing chart for the reading in color mode in the image reading apparatus of embodiment 3.
Figure 16:
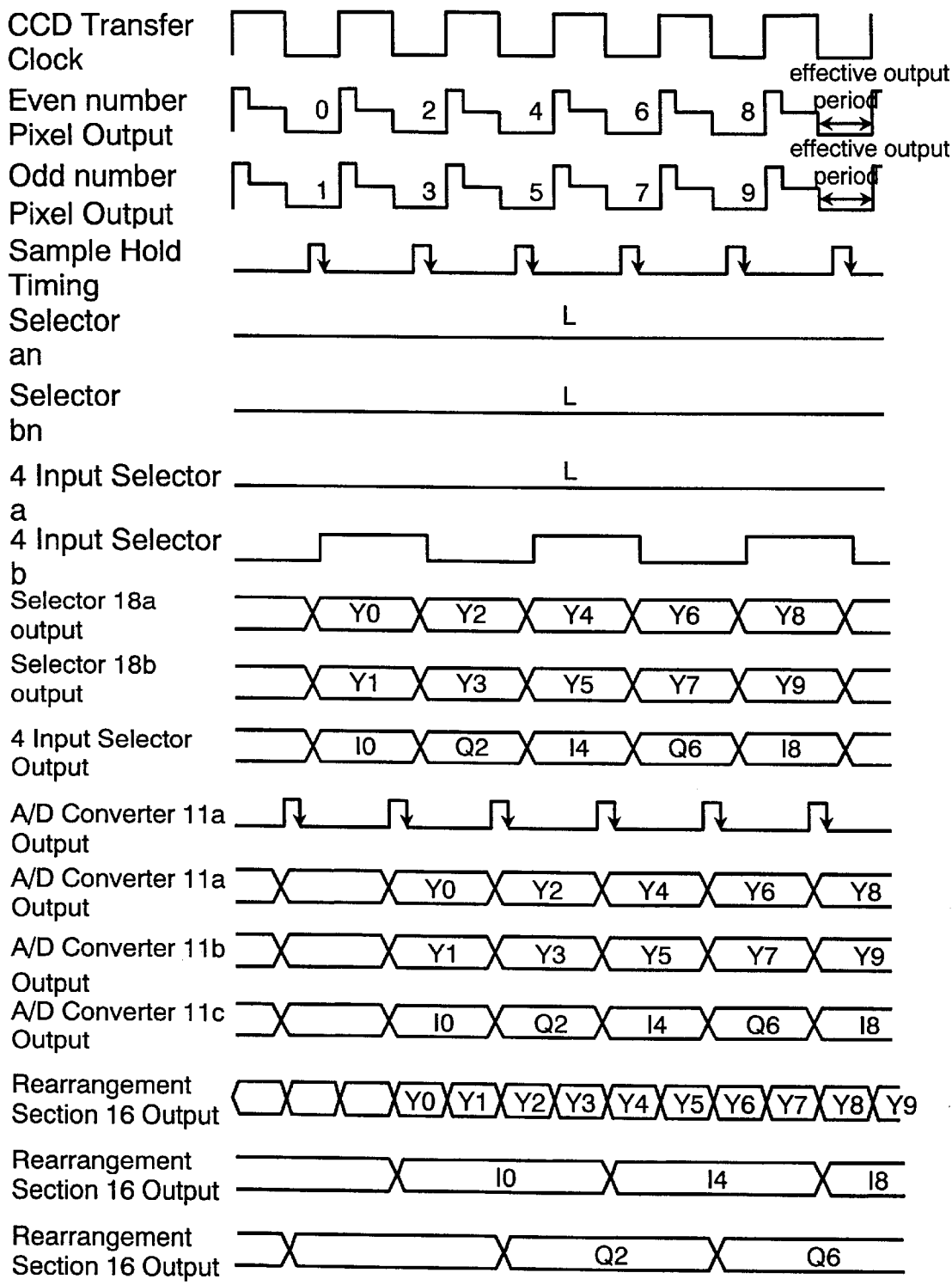
FIG. 16 shows a timing chart for the reading in monochrome mode in the image reading apparatus of embodiment 3.

FIG. 11 shows a block diagram of analog data processing sector in an image reading apparatus in accordance with a third exemplary embodiment of the present invention. FIG. 12A shows structure around a four-input selector provided in the image reading apparatus of the present embodiment 3, FIG. 12B exhibits operational logic of the four-input selector. FIG. 13 is a circuit diagram of I converter provided in the image reading apparatus of the present embodiment 3. FIG. 14 is a circuit diagram of Q converter provided in the image reading apparatus of the present embodiment 3. FIG. 15 is a timing chart for the reading in color mode in the image reading apparatus. FIG. 16 is a timing chart for the reading in monochrome mode in the image reading apparatus.

As shown in FIG. 11, an analog data processing sector of image reading apparatus in accordance with exemplary embodiment 3 comprises a gain corrector 7, an offset corrector 8, a sample holder 9, A/D converters 11*a*–11*c*, a timing generator 13, a reading mode controller 14, a rearrangement section 16, Y converters 17*a*, 17*b* (shown in FIG. 8), and selectors (selecting means) 18*a*, 18*b* (shown in FIG. 6); furthermore it contains an I converter (first chrominance converter) 20 for converting the R, G, B data into chrominance (I) data, a Q converter (second chrominance converter) 21 for converting the R, G, B data into chrominance (Q) data, and a four-input selector (selecting means) 22 of four inputs for time sharing and multiplexing the analog input signals.

The I converter 20 is formed of constant gain amplifiers 106*a*–106*c* and an operating amplifier 107, as shown in FIG. 13. The Q converter 21 is formed of constant gain amplifiers 108*a*–108*c* and an operating amplifier 109, as shown in FIG. 14.

The structures of the CCD line sensor, and the optical section and the mechanism of an image reading apparatus remain substantially the same as those of conventional counterparts described and shown earlier in FIG. 17 and FIG. 18. Therefore, the description of these items is omitted here.

A data reading in the present image reading apparatus will be described in the following with reference to FIG. 11, showing the block diagram, and FIG. 15 and FIG. 16, both being timing charts.

In the same manner as in embodiments 1 and 2, a document is read by the CCD line sensor 6, analog signals outputted from the CCD line sensor 6 are corrected at the gain corrector 7 and the offset corrector 8 with respect to the amplitude and the DC potential to a waveform meeting the input width of the A/D converters 11*a*–11*c*. Only the effective output is sample held by the sample holder 9.

In the following, the reading in color mode and the reading in monochrome mode will be described.

In the reading in color mode, the respective R, G and B signals from the CCD separated in the output signal from even-number pixels and that from odd-number pixels are held individually in accordance with respective sample hold timings of FIG. 15. In the selectors 18*a*, 18*b*, the analog signals outputted from the sample holder 9 are time shared and multiplexed in the even-number pixels and the odd-number pixels, with respect to each of the R and G color components, in the same way as in embodiment 2; in the four-input selector, the even-number pixels and the odd-number pixels of B are time shared and multiplexed in accordance with the respective waveforms of FIG. 15, selected under the logic of FIG. 12B. However, the outputs of Y, I and Q converters 17*a*, 17*b*, 20 and 21 are not selected.

The analog signals, in which the even-number pixels and the odd-number pixels have been multiplexed, outputted from the selector section 18*a*, 18*b* and the four-input selector section 22 are delivered respectively to the A/D converters 11*a*, 11*b*, 11*c*. These are converted into digital signals, and then delivered to the rearrangement section 16. In case of the reading in color mode, the rearrangement section 16 outputs the digital data as they are, because the respective outputs of A/D converters 11*a*–11*c* have the R, G and B components respectively that have been arranged in the order of pixels. Output from the rearrangement section 16 undergoes certain predetermined processing such as the line correction, chrominance correction, etc., before it is delivered to a later stage.

In the reading in monochrome mode, the output signals of respective R, G and B CCDs separated in the signals from the even-number pixels and that from the odd-number pixels are sample held in accordance with the respective sample hold timings of FIG. 16. The analog signals outputted from sample holder 9 are delivered as follows: the even-number pixel row of R, G and B are to the Y converter 17*a*, the I converter 20 and the Q converter 21, whereas the odd-number pixel row to the Y converter 17*b*.

The R, G and B analog signals entered to the Y converters 17*a*, 17*b* are amplified respectively at a certain predetermined gain and added, to become Y signals for outputting.

In the same way, the R, G and B analog signals entered to the I converter 20, the Q converter 21 are amplified respectively at a certain predetermined gain and added, to become I signal and Q signal respectively for outputting.

The Y signals outputted from the Y converters 17a, 17b are selected at the selector 18a with the row of even-number pixels of Y; while at the selector 18b with the row of odd-number pixels of Y. I signal outputted from the I converter 20 and Q signal outputted from the Q converter 21 are time shared and multiplexed at the four-input selector 22 into, for example, I0, Q2, I4, Q6 ·· in accordance with the waveform of FIG. 16, under the logic of FIG. 12B.

Outputs of the selectors 18a, 18b and the four-input selector 22 are delivered respectively to the A/D converters 11a–11c, to be converted into digital signals. Namely, the A/D converter 11a takes part of converting only Y signals of the even-number pixels, the A/D converter 11b takes part of converting only Y signals of the odd-number pixels, while the A/D converter 11c takes part of converting the time shared and multiplexed I signal and Q signal.

Digital data outputted from the A/D converters 11a, 11b, 11c are delivered to the rearrangement section 16; where, the Y data rows that have been separated into the even-number pixels and the odd-number pixels are recombined in a sequentially arranged single row of data, and the time shared and multiplexed I signal and Q signal are split into respective rows of data to be outputted. Output from the rearrangement section 16 undergoes a certain predetermined processing, before it is delivered to a later stage.

After the CCD line sensor 6 has read data for one line in a certain accumulation time, the carriage 3 moves by one line in a subsidiary scanning. Repeating this operation completes scanning of an entire page of the document.

Next, description is made on speed of the readings in color mode and in monochrome mode with an image reading apparatus of the present embodiment 3. It is generally expected that the reading in monochrome mode should be faster than in color mode.

Assume the accumulation time per one line needed for the reading in color to be 19.8 msec., number of pixels per one line to be 4960 pixels; the pixel output cycle per one signal is 8 µsec., as the CCD line sensor 6 outputs the respective R, G and B components separated in the even-number pixels and the odd-number pixels.

As the pixel output cycle per one output of the CCD line sensor 6 is 8 µsec., the pixel output cycle at selector section 18a, 18b and the four-input selector section 22 turns out to be 4 µsec. Namely, the conversion speed needed for the A/D converters 11a, 11b, 11c is 250 ksps.

In a case where the reading in monochrome mode is conducted at a speed twice as fast that in color mode, viz. the monochrome reading completes in half the time, the accumulation time per one line is 8.2 msec., the pixel output cycle per one signal of the CCD line sensor 6 is 4 µsec. When, as the selectors 18a, 18b and the four-input selector 22 deliver the outputs at a cycle of the same speed as the output cycle of CCD line sensor 6, the pixel output cycle turns out to be 4 µsec. Namely, the conversion speed needed for the A/D converters 11a, 11b, 11c is 250 ksps., or the same speed as that in color mode.

In the present image reading apparatus of embodiment 3, even in a case when the reading in monochrome mode is conducted at a speed twice as high that in color mode, the A/D conversion for the monochrome mode reading may be performed at the same speed needed for the reading in color mode, because the R, G and B signals are converted at the analog stage into Y signal by the Y converters 17a, 17b, and no dropout color is generated.

In addition, because the time shared and multiplexed I signal and Q signal, which have been converted at the I converter 20 and Q converter 21, are outputted by the rearrangement section 16 in the form of respective data rows, the structure of present embodiment may also provide a handy color mode.

The figures and values described in the above embodiments are exemplary, and it is to be noted that details of the structures may take other variations within the spirit of scope of the claims.

INDUSTRIAL APPLICABILITY

In a first structure of image reading apparatus in accordance with the present invention, when reading a document in monochrome mode, the selecting means selects the row of even-number pixels and that of odd-number pixels with respect to a selected color component, the A/D conversion for the respective pixel rows are conducted separately by individual A/D converter, and the rearranging means time shares and multiplexes these A/D converted pixel row signals into one single data row. Therefore, even if speed of the reading in monochrome mode is faster than in color mode the speed of A/D conversion may be suppressed at a low level. For example, in a case where the reading in monochrome is conducted at a speed twice as high that in color mode, the A/D conversion for the monochrome reading may be performed at the same speed needed for the reading in color mode. This offers quite an advantage for the A/D converters.

In a second structure of the present invention, the respective color components are converted at analog signal stage into luminance signal by the luminance converting means, and the selecting means selects the even-number pixels and the odd-number pixels, and then these are A/D converted separately by individual A/D converters. The rearranging means time shares and multiplexes these A/D converted pixel row signals into one single data row. Therefore, no dropout color is generated, and, even if speed of the reading in monochrome is faster than in color mode, the speed of A/D conversion may be suppressed at a low level. For example, in a case where the reading in monochrome is conducted at a speed twice as high that in color mode, the A/D conversion for the monochrome reading may be performed at the same speed needed for the reading in color mode. This offers quite an advantage for the A/D converters.

In a third structure, the respective color components of analog signal are converted into luminance signals by the luminance conversion means separately in the even-number pixels and the odd-number pixels, the selecting means selects the even-number pixels and the odd-number pixels, and then these are A/D converted separately by the individual A/D converters. The first color converter and the second color converter take part of converting into the first and the second chrominance signals, respectively. The rearranging means time shares and multiplexes the luminance signals of even-number pixels and odd-number pixels, and rearranges the first chrominance signal and the second chrominance signal that have been time shared and multiplexed by the selecting means into respective data rows. No dropout color is generated, and the first chrominance signal and the second chrominance signal may be used in a handy color mode. Even if speed of the reading in monochrome mode is faster than in color mode, the speed of A/D conversion may be suppressed at a low level. For example, in a case where the reading in monochrome is conducted at a speed twice as high that in color, the A/D conversion for the monochrome reading may be performed at the same speed needed for the reading in color mode. This offers quite an advantage.

What is claimed is:

1. In an image reading apparatus having imaging means for outputting image signals as a plurality of color components, with each signal of the color components being divided according to even-number pixels and odd-number pixels, and having sample holding means for holding the output of said imaging means, and for reading in a color mode and for reading in a monochrome mode at a speed faster than reading in the color mode, the image reading apparatus comprising:

selecting means, in reading in the color mode, for time sharing and multiplexing analog signals of the color components output from the sample holding means separately in rows of even-number pixels and odd-number pixels, and in reading in the monochrome mode, for outputting a color component selected as a dropout color among the analog signals of the color components output from said sample holding means separately in rows of even-number pixels and odd-number pixels, or for outputting a luminance signal from the analog signals of the color components output from the sample holding means separately in rows of even-number pixels and odd-number pixels, signal converting means for converting analog signals output from said selecting means into digital signals, and rearranging means, in reading in the color mode, for outputting the digital signals from the signal converting means, and in reading in the monochrome mode, for rearranging data rows that had been divided into rows of even-number pixel and odd-numbered pixel into a single sequential data row.

2. The image reading apparatus according to claim 1, further comprising:

first Y converting means for summing analog signals in the rows of even-number pixels of the color components output from the sample holding means after multiplying with respective constants, and second Y converting means for summing analog signals in the rows of odd-number pixels of the color components output from the sample holding means after multiplying with respective constants, wherein the selecting means, for reading in the monochrome mode, outputs the data rows of the first Y converting means and the second Y converting means separately.

3. The image reading apparatus according to claim 2, further comprising:

first chrominance signal converting means for converting analog signals of one of either the even-number pixel rows or the odd-number pixel rows of the color components output from the sample holding means into first chrominance signals, and second chrominance signal converting means for converting analog signals of the other of either the even-number pixel rows and the odd-number pixel rows into second chrominance signals, wherein the selecting means in reading in the color mode, outputs analog signals of the color components output from the sample holding means after time sharing and multiplexing, and in reading in the monochrome mode, selects the luminance signals generated from the analog signals of the color components output from the sample holding means, and conducts time sharing and multiplexing of the first chrominance signals and the second chrominance signals.

4. The image reading apparatus according to claim 1, wherein the signal converting means comprises, for reading in the color mode, at least a first A/D conversion section for converting the analog signal of a first color component into a digital signal and a second A/D conversion section for converting the analog signal of a second color component into a digital signal, and for reading in the monochrome mode, the first and second A/D conversion sections convert the analog signal of the even-number pixels or the odd-number pixels of a selected color component into a digital signal.

5. The image reading apparatus according to claim 1, wherein the signal converting means comprises, for reading in the color mode, at least a first A/D conversion section for converting the analog signal of a first color component into a digital signal and a second A/D conversion section for converting the analog signal of a second color component into a digital signal, and for reading in the monochrome mode, the first and second A/D conversion sections convert the luminance signal of the even-number pixels or the odd-number pixels generated from analog signals of the plurality of color components output from the sample holding means into a digital signal.

6. The image reading apparatus of claim 3, wherein the rearranging means outputs the time shared and multiplexed first chrominance signal and second chrominance signal separately in respective data rows.

7. The image reading apparatus according to claim 2, wherein the signal converting means comprises, for reading in the color mode, at least a first A/D conversion section for converting the analog signal of a first color component into a digital signal and a second A/D conversion section for converting the analog signal of a second color component into a digital signal, and for reading in the monochrome mode, the first and second A/D conversion sections convert the luminance signal of the even-number pixels or the odd-number pixels generated from analog signals of the plurality of color components output from the sample holding means into a digital signal.

8. The image reading apparatus according to claim 3, wherein the signal converting means comprises, for reading in the color mode, at least a first A/D conversion section for converting the analog signal of a first color component into a digital signal and a second A/D conversion section for converting the analog signal of a second color component into a digital signal, and for reading in the monochrome mode, the first and second A/D conversion sections convert the luminance signal of the even-number pixels or the odd-number pixels generated from analog signals of the plurality of color components output from the sample holding means into a digital signal.

* * * * *